Jan. 28, 1969  D. L. YOUNG  3,423,986
RIVET GUN FOR BLIND RIVETS
Filed March 11, 1966
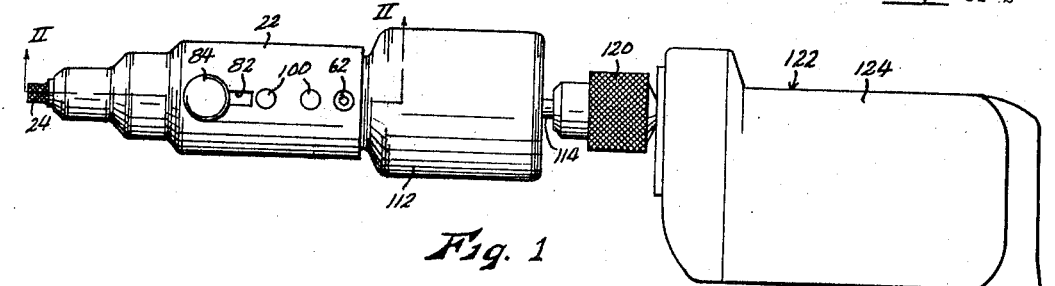
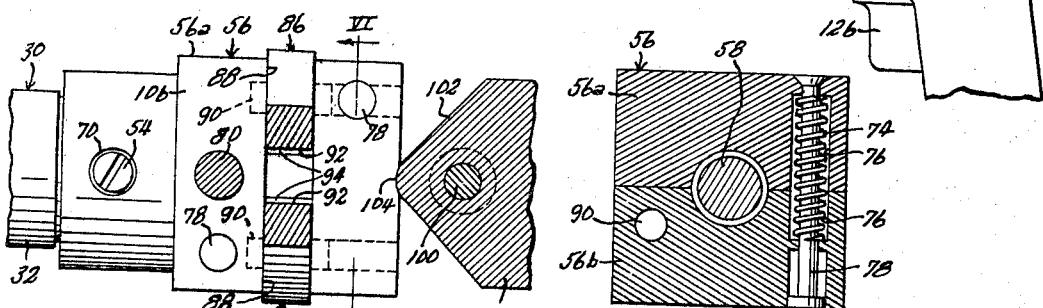
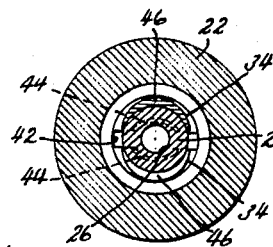
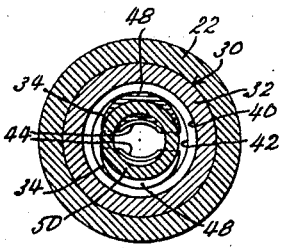
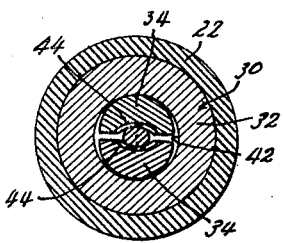
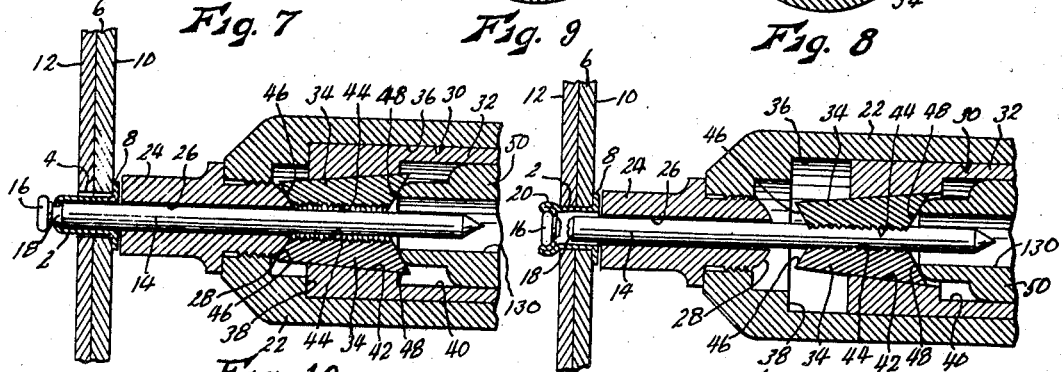
INVENTOR.
Dale L. Young
BY John A. Hamilton
Attorney.

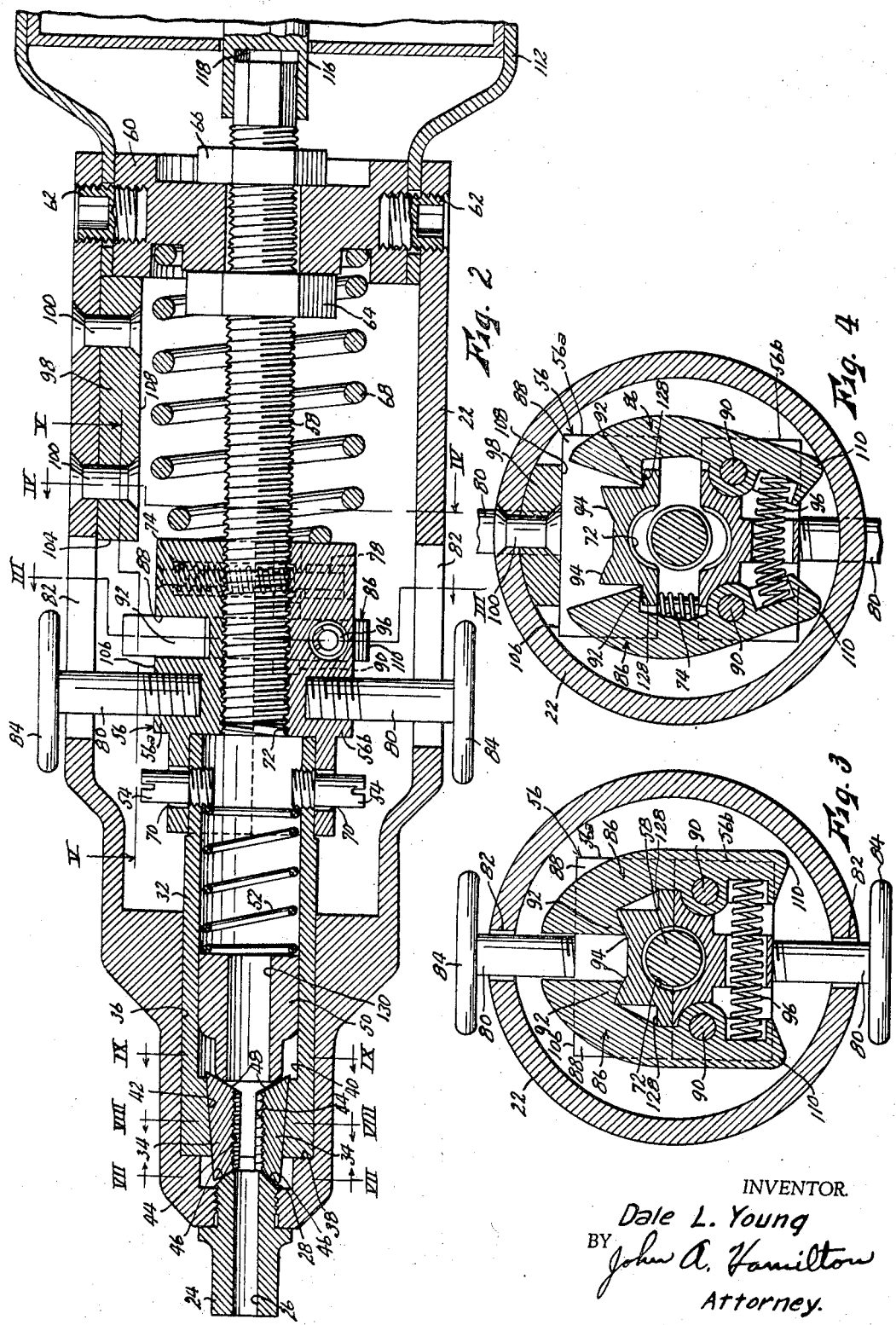

United States Patent Office 3,423,986
Patented Jan. 28, 1969

3,423,986
RIVET GUN FOR BLIND RIVETS
Dale L. Young, Denver, Colo, assignor to Rivetmaster, Inc., Denver, Colo, a corporation of Colorado
Filed Mar. 11, 1966, Ser. No. 533,499
U.S. Cl. 72—391
Int. Cl. B21d *31/00*
2 Claims

ABSTRACT OF THE DISCLOSURE

A rivet gun for setting blind rivets by tensioning the mandrels thereof to the point of rupture, comprising a body member adapted to receive a mandrel therein. A chuck is movable in the body member parallel to the mandrel and is operable to grip the mandrel when retracted, and to release the mandrel when advanced. Power means is provided for moving the chuck. The power means comprises a screw rotatably driven in one direction only. A nut is releasably connected to the screw and to which the chuck is attached, whereby rotation of the screw retracts the nut and chuck. Manual means is provided for engaging the nut on the screw. Latch means is operable to secure the nut in engagement with the screw. Release means is operable to release the latch when the nut has been retracted to a predetermined degree, and resilient means is provided for advancing the nut and chuck whenever the nut is released from the screw.

---

This invention relates to new and useful improvements in rivet guns, and has particular reference to a rivet gun operable to set "blind" rivets. A blind rivet, also commonly known as a "pop" rivet, consists of a tubular body adapted to be inserted through a rivet hole in the mark from the accessible or "free" side of the work, so as to project outwardly from the blind side of the work, and having a flange engaging the free side of the work. An elongated mandrel is slidably contained through the body, projecting from the flanged end thereof, and has an enlarged head at the opposite end of the body. The head is small enough to pass through the rivet hole, but larger than the internal diameter of the body. The rivet is set by pulling the mandrel axially toward the free side of the work, whereupon the head thereof upsets that portion of the body projecting at the blind side of the work to form a second flange. Further tension on the mandrel breaks it off within the body, and it is discarded.

The principal object of the present invention is the provision of a rivet gun for this class of rivets, said gun consisting of a housing having a nose-piece adapted to be seated against the rivet flange and being tubular to admit the rivet mandrel to the interior of the housing, a chuck carried movably in said housing and operable to grip said mandrel, and power means for moving said chuck whereby to tension and break said mandrel.

Another object is the provision of a rivet gun of the character described wherein said chuck is movable from an advanced position to a retracted position to tension and break said mandrel, having automatic means operable to close said chuck to grip said mandrel whenever the chuck is retracted, and to open said chuck to release said mandrel whenever said chuck is advanced, and means biasing said chuck toward its advanced position.

A further object is the provision of a rivet gun of the character described wherein the power means for driving said chuck includes a rotatably driven screw, whereby the gun may be mounted on and driven by an ordinary hand drill motor, as an attachment or accessory thereto.

Still another object is the provision of a hand drill of the character described wherein said chuck is connected to said screw by means of a non-rotatable nut connected to said chuck and disengageably threaded on said screw, and with the addition of manual means for engaging said nut operatively on said screw, and automatic means for disengaging said nut from said screw when said chuck has been retracted to a pre-determined degree.

Other objects are simplicity and economy of construction, ease and convenience of usage, and efficiency and dependability of operation.

With these objects in view, as well as other objects which will appear in the course of the specification, reference will be had to the accompanying drawing, wherein:

FIG. 1 is a side view of a rivet gun embodying the present invention, shown operatively mounted in an ordinary hand drill unit, FIG. 2 is an enlarged fragmentary sectional view taken on line II—II of FIG. 1, with parts left in elevation, FIG. 3 is a sectional view taken on line III—III of FIG. 2, showing the nut closed to its operative position, FIG. 4 is a view similar to FIG. 3, taken on line IV—IV of FIG. 2, showing the nut opened to its inoperative position, FIG. 5 is a fragmentary sectional view taken on line V—V of FIG. 2, with parts omitted, FIG. 6 is a sectional view taken on line VI—VI of FIG. 5, FIG. 7 is a sectional view taken on line VII—VII of FIG. 2, showing the chuck jaws open, FIG. 8 is a sectional view taken on line VIII—VIII of FIG. 2, but showing the chuck jaws closed on a rivet mandrel, FIG. 9 is a sectional view taken on line IX—IX of FIG. 2, FIG. 10 is a fragmentary view similar to FIG. 1 but showing the gun in operative position to a rivet, preparatory to setting said rivet, and FIG. 11 is a view similar to FIG. 10 but showing the position of the parts after the rivet has been set and the mandrel broken.

Like reference numerals apply to similar parts throughout the several views. FIGS. 10 and 11 illustrate the type of blind rivet which the rivet gun comprising the subject matter of the present invention is adapted to be used. Said rivet comprises a tubular body member 2 of malleable metal adapted to be inserted freely into a rivet hole 4 formed in the work piece 6, and having an external flange 8 adapted to abut the free side 10 of the work. Said body member is of such length as to extend outwardly from the blind side 12 of the work. Inserted through said body member is a mandrel 14 having an enlarged head 16 at the non-flanged end of the body member, and projecting substantially outwardly from the flanged end of the body member. The mandrel is weakened adjacent its head, as by being necked at 18, and the body member may be rolled into said neck to permit accidental loss of the body member from the neck during preliminary handling. Then the rivet is set by pulling the mandrel toward the free side of the work. The mandrel head 16 first upsets the projecting portion of the body member to form a flange 20 at the blind side of the work, whereby the rivet is secured. Further tension on the mandrel causes it to break off at neck 18. The parts then have the positions shown in FIG. 11. The broken off portion of the mandrel is discarded. The head portion is usually retained by "curling" of the rivet body around said head during the upsetting operation, also as shown in FIG. 11, but this is immaterial to the present invention. The rivet gun forming the subject matter of the present invention is operable to perform the rivet setting operation just described.

As shown, said rivet gun includes a tubular housing 22 formed of steel or the like, being cylindrical in form and being reduced in diameter toward its forward end. Threaded into the extreme forward end of the body member is a nose-piece 24, the forward end of which is adapted to abut rivet flange 8, and which has a bore 26 coaxial with the housing for slidably receiving the rivet mandrel 14, whereby said mandrel extends into the interior of said housing. The inner end of the nose-piece, within the housing, is spherically rounded, as indicated at 28, to form a cam surface.

Within the housing, the rivet mandrel is gripped by a chuck indicated generally by the numeral 30 and including a carrier sleeve 32 and a pair of jaws 34. Sleeve 32 is slidably mounted in a bore 36 formed coaxially in the housing, forward movement of said sleeve being limited by a shoulder 38 of said bore. Sleeve 32 is tubular, having a bore 40 the forward end portion of which is of forwardly converging frustro-conical form, as indicated at 42. Jaws 34 extend longitudinally in conical bore 42, being disposed at diametrically opposite sides thereof, and are externally of conical form, whereby as they are moved forwardly in bore 42, they are forced closer together, while rearward movement thereof in bore 42 permits them to be moved radially apart. However, they always project forwardly from the sleeve, even when they are expanded sufficiently to admit therebetween the largest rivet mandrel which can be inserted through nose-piece bore 26. The facing surfaces of said jaws each have a groove 44 formed longitudinally therein, said grooves being peripherally threaded or serrated as shown to form sharp teeth adapted to grip the rivet mandrel whenever the jaws are contracted toward each other by forward movement thereof in sleeve bore 42.

The forward ends of jaws 34 are bevelled to form forwardly divergent cam surfaces 46, and the rearward ends thereof are bevelled to form rearwardly divergent cam surfaces 48. Whenever carrier sleeve 32 is moved forwardly to engage housing shoulder 38, as in FIGS. 2 and 10, forward jaw cams 46 are engaged and moved radially apart by spherical cam 28 of the nose-piece, whereby to move said jaws to their expanded position. Whenever sleeve 32 is moved rearwardly from housing shoulder 38, jaws 34 are moved forwardly with respect to said sleeve, whereby to be contracted toward each other by conical sleeve bore 42, by a plunger 50 carried slidably in a cylindrical portion of sleeve bore 40 behind conical portion 42 thereof. The forward end of said plunger is rounded and engages the rear cam surfaces 48 of the jaws, and the plunger is biased forwardly by a compression spring 52 carried in said sleeve, said spring abutting at its forward end against said plunger, and at its rearward end against a pair of studs 54 threaded into said sleeve adjacent the rearward end thereof, at diametrically opposite sides thereof. Said studs also extend outwardly from said sleeve, for a purpose which will presently appear. Plunger 50 not only urges jaws 34 forwardly as described, but also the camming action thereof on rearward jaw cams 48 urges said jaws radially apart to maintain the rearward end portions thereof in engagement with the conical bore 42 of the sleeve.

Jaw carrier sleeve 32 is moved axially in housing 22 by means including a split nut indicated generally by the numeral 56 and attached to the rearward end of the said sleeve within the housing, and a power screw 58 carried axially in said housing, the forward end portion of said screw being engageable in said nut. The rearward end portion of said screw is rotatably mounted in a plug 60 secured in the rearward end of housing 22 by screws 62, and is secured against longitudinal movement by a pair of lock nuts 64 and 66 secured thereon respectively at the opposite faces of said plug. A compression spring 68 surrounds said screw, abutting at its forward end against nut 56 and at its rearward end against plug 60. Spring 68 is substantially stronger than spring 52 of the jaw chuck, whereby whenever nut 56 is disengaged from screw 58, as will be described, spring 68 will urge nut 56 and carrier sleeve 32 forwardly with sufficient force that nose-piece cam 28 will engage and force jaws 34 rearwardly in sleeve bore 42 against the pressure of spring 52, whereby said jaws are radially expanded as previously described.

Nut 56 is externally rectilinear in form, except the forward portion thereof which is cylindrical and tubular to receive the rearward end portion of sleeve 32 therein. The outwardly extended portions of sleeve studs 54 are slidably engaged in holes 70 formed therefor in the nut, and extend outwardly from said nut. The nut is split diametrically to the threaded bore 72 thereof, in a plane normal to the common axis of studs 54, whereby to divide it into two sections 56a and 56b. The two sections of the nut are urged radially apart, whereby to disengage the threaded bore 72 thereof from screw 58, by a pair of compression springs 74 (see FIGS. 2, 5 and 6) interposed between said sections and engaged in sockets 76 formed in said sections. Each of said springs is guided on a rod 78 riveted in one of the nut sections and slidable in the other nut section. Outward movement of the nut sections, relative to chuck sleeve 32, is permitted by sliding movement of said nut sections on sleeve studs 54.

Nut sections 56a and 56b may be pressed together against the pressure of springs 74, whereby to engage the threaded bore 72 thereof on screw 58, by means of a pair of push rods 80 threaded respectively at their inner ends in said nut sections, and extending outwardly therefrom normally to the plane of division of the nut. Said push rods, each extend through a longitudinally elongated slot 82 formed in the wall of housing 22, and each has a push-button 84 affixed to the outer end thereof. It will be apparent that by manually pressing inwardly on said push-buttons, nut 56 may be closed on screw 58. Also, the engagement of push rods 80 in slots 82 prevents rotation of the nut in the housing. Therefore, whenever the nut is closed, rotation of screw 58 in a clockwise direction, looking forwardly will cause nut 56 to be moved rearwardly in the housing, whereby to cause contraction of the chuck jaws 34 as previously described.

Nut 56 is retained releasably in its closed position by means including a pair of latch levers 86 disposed respectively at opposite sides of the nut and movable in slots 88 formed in said nut. Each lever is pivoted in nut section 56b on a pivot pin 90 extending parallel to the nut axis, and extends from said pivot toward nut section 56a. A tooth 92 is formed at the free end of each lever, said teeth facing inwardly toward the nut axis and being adapted, when said free ends are moved toward each other, to engage shoulders 94 of nut section 56a to secure the nut in its closed position as best shown in FIG. 3. Said levers are biased by a compression spring 96, interposed between the ends thereof opposite from the toothed ends thereof to their operative position shown in FIG. 3, whereby the levers are automatically pivoted into position to lock the nut closed whenever the nut sections are pressed together by means of push-buttons 84. It will be seen that when levers 86 are in their operative positions as shown in FIG. 3, the tooth ends of said levers project outwardly from the nut and are spaced apart.

Latch teeth are moved out of engagement with shoulders 94 by means of a cam 98 secured in one side of housing 22, at the rearward end thereof, by rivets 100. As best shown in FIG. 5, the forward end of said cam is forwardly tapered to form a wedge 102, the point 104 of which is aligned with the space between the projecting ends of levers 86, but spaced rearwardly from said levers when nut 56 is in its forwardmost position, as represented by engagement of chuck sleeve 32 with housing shoulder 38. However, when nut 56 has been moved rearwardly to a predetermined degree by the operation of screw 58, as previously described, the point 104 of wedge 102 enters between the projecting ends of levers 86 camming them apart against the pressure of spring 96 to disengage teeth 92 from shoulders 94, whereupon the nut sections 56a and 56b are separated by springs 74 to disengage them from screw 58, as previously described. Nut 56 is then returned forwardly by spring 68. While the nut is open, it is prevented from "floating" laterally to screw 58 by the engagement or near-engagement of the outer surface 106 of nut section 56a with the inner surface 108 of cam 98, and by the engagement or near-engagement of the heels 110 of levers 86 with the internal wall of housing 22, both as best shown in FIG. 4. Such "floating" could cause accidental engagement of one or the other sections of the nut with screw 58.

A speed reduction unit 112 is affixed to the rearward end of housing 22 by means of screws 62. Said speed reduction unit has an input shaft 114 (FIG. 1) and an output shaft 116 (FIG. 2), the latter being axially aligned with screw 58 and having a non-circular axial socket 118 in which the rearward end of screw 58 is non-rotatably engaged. The purpose of said reducer unit is to provide a suitably slow rotation of screw 58. However, the specific internal construction of said reducer is well known in the art and is not pertinent to the present invention, and is not therefore shown. Input shaft 114 could be driven rotatably by an electric motor, not shown, forming an integral element of the rivet gun itself, but in the interests of convenience and economy is shown as adapted to be clamped operatively in the chuck 120 of an ordinary electric hand drill unit 122, which of course includes an electric motor 124 operable to turn chuck 120, and a trigger switch 126 operable to energize said motor.

In use the operator, with chuck 30 in its forwardmost position against housing shoulder 38, as shown in FIGS. 2 and 10, inserts mandrel 14 of the rivet in bore 26 of nose-piece 24, and inserts body member 2 of the rivet into rivet hole 4 of the work piece 6, performing either of these operations first, as may be convenient under the circumstances of each particular job. Screw 58 is then rotated by pressing trigger switch 26 to actuate motor 124, or said screw may be rotated continuously during use of the gun. Then, using one hand to hold hand drill unit 122, and the other hand to grasp housing 22 to prevent rotation of the latter with the screw, the operator presses forwardly on the gun so that nose-piece 24 urges rivet flange 8 firmly against the free side 10 of the work, and presses inwardly on push-buttons 84. This presses sections 56a and 56b of nut 56 together against the pressure of separating springs 74, thereby closing the threaded bore 72 of said nut operatively on screw 58, and the nut is secured in this closed position by latch levers 86, spring 96 functioning to urge teeth 92 of said levers into engagement with shoulders 94 of nut section 56a. No further pressure on push-buttons 86 is required to maintain the nut in the closed position.

Rotation of screw 58 then retracts nut 56 and chuck sleeve 32 rearwardly in the housing, compressing spring 68. Rearward movement of chuck sleeve 32 from housing shoulder 38 permits chuck jaws 34 to be urged forwardly relative to said sleeve, by plunger 50 and spring 52, whereby said jaws are forced toward each other by the conical configuration of sleeve bore 42, so that serrated grooves 44 of said jaws grip mandrel 14. Said jaws therefore exert an initial rearward force on said mandrel, and the reactive forward force on jaws 34 wedges them still farther forwardly in sleeve bore 42, causing them to grip the mandrel still more firmly. The greater the pull exerted on the mandrel, the tighter said jaws will grip it. The rearward pulling force exerted on the mandrel first causes rivet head 16 to upset rivet body 2 to form flange 20 at the blind side 12 of the work 6, and then fractures the mandrel at the neck 18 thereof, both as previously described. The parts then have the relative positions shown in FIG. 11.

Nut 56 and chuck 30 continue to be moved rearwardly by screw 58, since the projecting ends of levers 86 have not yet moved far enough to the rear to be engaged by releasing cam wedge 102. It is of course essential that the rearward nut movement required to bring about said engagement exceeds the maximum movement which may be required to set the rivet and fracture the rivet mandrel. However, when the projecting ends of levers 86 have moved sufficiently to the rear, point 104 of wedge 102 enters therebetween, and cams them apart to disengage teeth 92 thereof from shoulders 94 of nut section 56a, whereupon the nut sections are separated by springs 74, disengaging the threaded bore 72 of said nut from screw 58. Separating movement of the nut sections is limited by engagement of latch teeth 92 with a second pair of shoulders 128 of 56a, as best shown in FIG. 4. Nut 56, thus released from the screw, is instantly returned forwardly by spring 68, and of course carries chuck 30 forwardly with it until chuck sleeve 32 engages housing shoulder 38.

Just before sleeve 32 engages shoulder 38, the forward cam surfaces 46 of jaws 34 engage the spherical cam surface 28 of nose-piece 24, and the jaws are therefore forced rearwardly in sleeve bore 42 during the final forward movement of the sleeve, against the pressure of spring 52, since spring 68 is substantially stronger than spring 52. At the same time, nose-piece cam 28 and the forward end of plunger 50 deliver simultaneous but opposite hammer blows respectively against the forward cam surfaces 46 and the rearward cam surfaces 48 of the jaws, insuring that said jaws will be separated from each other and follow the contour of conical sleeve bore 42, even if the jaw teeth have become solidly embedded in the rivet mandrel. The mandrel is thus effectively released, and may be discarded simply by allowing it to fall through the nose-piece. Plunger 50 is tubular as shown to allow entry of mandrel 14 therein, having a bore 130 formed axially therethrough.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A rivet gun for blind rivets comprising:
   (a) an elongated tubular housing having a tubular nosepiece at the forward end thereof for slidably receiving the mandrel of a blind rivet therein, whereby said mandrel extends axially into said housing,
   (b) A chuck mounted in said housing for movement parallel to the axis thereof, and operable to grip that portion of the rivet mandrel projecting into said housing, and
   (c) power actuated means carried by said housing and operable to move said chuck first rearwardly and then forwardly in said housing, between forward and rearward limits, said power activated means comprising a nut attached to said chuck within said housing and having a threaded bore parallel to the movement of said chuck, a rotatably driven screw mounted in said housing and operably engaged in the bore of said nut, said screw being rotatably in one direction only and said nut being disengageable from said screw, manually operable means for engaging said nut operably on said screw whereby to initiate rearward movement of said nut and chuck, release means carried by said housing and operable to release said nut from said screw when said chuck has been moved rearwardly a predetermined distance, and resilient means operable to urge said nut forwardly in said housing whenever the former is disengaged from said screw.

2. A rivet gun for blind rivets comprising:
   (a) an elongated tubular housing having a tubular nosepiece at the forward end thereof for slidably receiving the mandrel of a blind rivet therein, whereby said mandrel extends axially into said housing,
   (b) a chuck mounted in said housing for movement parallel to the axis thereof, and operable to grip that portion of the rivet mandrel projecting into said housing, and (c) power actuated means carried by said housing and operable to move said chuck first rearwardly and then forwardly in said housing, between forward and rearward limits, said power actuated means comprising a nut attached to said chuck within said housing and having a threaded bore parallel to the movement of said chuck, a rotatably driven screw mounted in said housing and operably engaged in the bore of said nut, said nut being split diametrically to its bore into two sections separable radially to the nut axis to disengage said nut from said screw, said screw being rotatable in one direction only to retract said nut rearwardly, resilient means biasing said nut sections apart to disengage said screw, manually operable means for moving said nut sections together to engage said screw, latch means carried by said nut and operable to secure said nut sections in their screw-engaging position, resilient means carried by said nut and operable to move said latch means to its operative position whenever said nut sections are moved to their screw-engaging position by said manually operable means, release means carried by said housing and operable to release said latch means whenever said nut has been moved rearwardly by said screw a predetermined distance, whereupon said nut is disengaged from said screw, and resilient means carried by said housing and operable to urge said nut forwardly in said housing when said nut is disengaged from said screw.

References Cited

UNITED STATES PATENTS

| | | | |
|---|---|---|---|
| 3,028,987 | 4/1962 | Van Hecke | 72—391 |
| 3,095,106 | 6/1963 | Morrison | 72—391 |
| 3,144,158 | 8/1964 | Nouvelet | 72—114 |
| 3,197,987 | 8/1965 | Martin | 72—391 |
| 3,324,700 | 6/1967 | Elliott | 72—391 |

CHARLES W. LANHAM, *Primary Examiner.*

G. P. CROSBY, *Assistant Examiner.*

UNITED STATES PATENT OFFICE
CERTIFICATE OF CORRECTION

Patent No. 3,423,986 January 28, 1969

Dale L. Young

It is certified that error appears in the above identified patent and that said Letters Patent are hereby corrected as shown below:

Column 1, lines 31 and 32, cancel "also commonly known as a "pop" rivet --.

Signed and sealed this 1st day of September 1970.

(SEAL)
Attest:

Edward M. Fletcher, Jr.

Attesting Officer

WILLIAM E. SCHUYLER, JR.

Commissioner of Patents